(12) United States Patent
Desain

(10) Patent No.: US 6,275,222 B1
(45) Date of Patent: Aug. 14, 2001

(54) SYSTEM AND METHOD FOR SYNCHRONIZING A GRAPHIC IMAGE AND A MEDIA EVENT

(75) Inventor: Petrus Wilhelmus Maria Desain, Nijmegen (NL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/708,286

(22) Filed: Sep. 6, 1996

(51) Int. Cl.⁷ .............................. G06F 15/00; G10H 5/02
(52) U.S. Cl. ............................................... 345/302; 84/645
(58) Field of Search ............................. 345/116–302; 84/101–649; 707/500, 526

(56) References Cited

U.S. PATENT DOCUMENTS

| | | |
|---|---|---|
| 4,247,571 | 1/1981 | Flament . |
| 4,313,036 | 1/1982 | Jabara et al. . |
| 4,546,212 | 10/1985 | Crowder et al. . |
| 4,757,495 | 7/1988 | Decker et al. . |
| 4,812,786 | 3/1989 | Davarian et al. . |
| 5,012,511 | 4/1991 | Hanle et al. . |
| 5,073,890 | 12/1991 | Danielsen . |
| 5,077,789 | 12/1991 | Clark, Jr. et al. . |
| 5,146,833 * | 9/1992 | Lui ........................................ 84/462 |
| 5,159,592 | 10/1992 | Perkins . |
| 5,159,594 | 10/1992 | Bales et al. . |
| 5,173,934 | 12/1992 | Marquet et al. . |
| 5,185,742 | 2/1993 | Bales et al. . |
| 5,206,899 | 4/1993 | Gupta et al. . |
| 5,214,641 | 5/1993 | Chen et al. . |
| 5,289,528 | 2/1994 | Ueno et al. . |
| 5,315,647 | 5/1994 | Araujo . |
| 5,388,264 * | 2/1995 | Tobias, II et al. ................... 395/650 |
| 5,392,345 | 2/1995 | Otto . |
| 5,410,543 | 4/1995 | Seitz et al. . |
| 5,450,482 | 9/1995 | Chen et al. . |
| 5,459,780 | 10/1995 | Sand . |
| 5,471,318 | 11/1995 | Ahuja et al. . |
| 5,490,212 | 2/1996 | Lautenschlager . |
| 5,511,002 * | 4/1996 | Milne et al. ...................... 364/514 R |
| 5,537,401 | 7/1996 | Tadamura et al. . |
| 5,544,229 | 8/1996 | Creswell et al. . |
| 5,548,636 | 8/1996 | Bannister et al. . |
| 5,550,906 | 8/1996 | Chau et al. . |
| 5,577,110 | 11/1996 | Aquino . |
| 5,619,557 | 4/1997 | Van Berkum . |

(List continued on next page.)

FOREIGN PATENT DOCUMENTS

| | | |
|---|---|---|
| 43 29 172 | 8/1993 | (DE) . |
| 590863 | 4/1994 | (EP) . |
| 2270814 | 3/1994 | (GB) . |
| 2271912 | 4/1994 | (GB) . |
| 2280334 | 1/1995 | (GB) . |

OTHER PUBLICATIONS

Apple, Macromind MediaMaker, Macromind, pp. 145, 148, 151, and 182–183, Dec. 1990.*

*Primary Examiner*—Hosain T. Alam
*Assistant Examiner*—Alford W. Kindred
(74) *Attorney, Agent, or Firm*—McGuireWoods, LLP; Stephen C. Kaufman

(57) ABSTRACT

In an illustrative embodiment, the invention discloses a computer system in which an arbitrary set of graphical images can be used to navigate through a musical score. The musical score may be read through by a user while listening to the music and pointing to a corresponding position in the music. To this end, tracking information may be stored with image as a time-place mapping. In navigation through the musical score, the mapping may be used inversely to calculate musical time from a place pointed at in the score. In collaboration, the mapping may be used to calculate corresponding positions in different versions (parts) of the same musical score presented to different users.

20 Claims, 8 Drawing Sheets

U.S. PATENT DOCUMENTS

| | | |
|---|---|---|
| 5,657,377 | 8/1997 | Pinard et al. . |
| 5,657,383 | 8/1997 | Gerber et al. . |
| 5,663,517 * | 9/1997 | Oppenheim .......................... 84/649 |
| 5,703,943 | 12/1997 | Otto . |
| 5,737,333 | 4/1998 | Civanlar et al. . |
| 5,742,675 | 4/1998 | Kilander et al. . |
| 5,751,338 | 5/1998 | Ludwig, Jr. . |
| 5,784,546 | 7/1998 | Benman, Jr. . |
| 5,812,533 | 9/1998 | Cox et al. . |
| 5,812,819 | 9/1998 | Rodwin et al. . |

* cited by examiner

The map building procedure

Display mode

Looking up a time by the map-interpreter

Select mode

Looking up a position by the map-interpreter

Collaboration mode

SYSTEM AND METHOD FOR SYNCHRONIZING A GRAPHIC IMAGE AND A MEDIA EVENT

BACKGROUND OF THE INVENTION

This invention relates to a system and method for synchronizing a graphic image and a media event.

INTRODUCTION TO THE INVENTION

Our work extends to synchronizing a graphic image and a media event by way of a digital computer. By the notion, a "media event", we mean, e.g., the contents of an audio file, a MIDI file (Musical Instrument Digital Interface), a computer animation, or a video file; and, by the notion "a graphic image", we mean a semiotic construct e.g., a printed or hand-crafted musical score, a sketch, remarks, a storyboard, or an ethnic notation. For the sake of pedagogy, however, the following discussion references a particular (illustrative) case, wherein the media event comprises a digital compact disk (CD) representation of a musical performance and, the graphic image comprises a corresponding printed musical score from whence the performance can be realized.

SUMMARY OF THE INVENTION

We note that navigation through musical material in computer systems has always been a difficult problem. For example, typical extant systems present the music at a very low level (as an audio signal or time-line), or the musical score produced from an internal representation of the musical material looks clumsy or unprofessional.

We have now discerned a methodology and discovered a computer system in which any arbitrary set of graphical images can be used to navigate through musical material (i.e., the media event). A central concept, to this end, is the following. Musical material may be "read through" by a user while listening to the music and pointing to a corresponding position in the music (e.g., with a mouse, a touch/screen, or graphic tablet). This tracking information may be stored with the graphical image as a time-place mapping. In navigation through the musical material, the mapping may be used in inverse form to calculate musical time from a place pointed at in the score.

Accordingly, given this tracking information, selections of musical fragments can be made and operations (replay, record etc.) can be done depending on a particular realization of the present invention, and of which it thereby becomes a "front-end". In a collaborative setup, different score layouts (parts) may be coordinated through the use of the time-place maps. These advantages, and others, are further detailed below.

We now disclose the invention by way of a computer system comprising:

1) means for storing a time-based media file corresponding to a media event;
2) means for storing a graphic image corresponding to the media event; and
3) means for relating time position in the media file with spatial position in the graphic image, so that a time-place mapping is created between the media file and the graphic image.

In a second aspect, the present invention discloses a computer method comprising the steps of:

1) storing a time-based media file that corresponds to a portion of a media event;
2) storing a graphic image that corresponds to a portion of the media event; and
3) relating time position in the media file with spatial position in the graphic image by moving a pointing device over the graphic image while the media file is presented, thereby constructing a time-place mapping between the media file and the graphic image.

BRIEF DESCRIPTION OF THE DRAWING

The invention is illustrated in the accompanying drawing, in which.

DETAILED DESCRIPTION OF THE INVENTION

Figure 1:
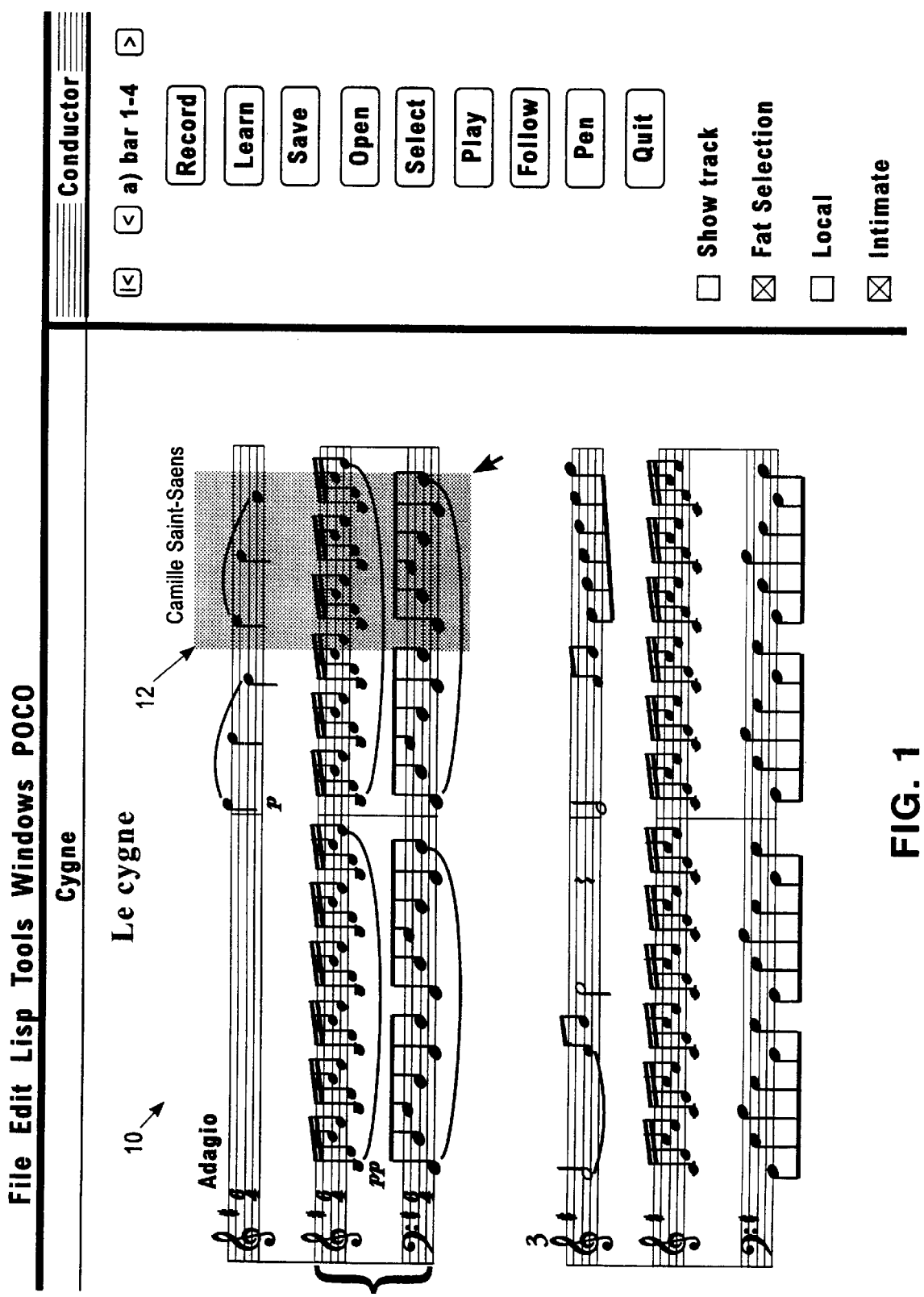
FIG. 1 shows a computer screen display of a graphic image.

Attention is first directed to FIG. 1, which shows a computer screen display comprising a graphic image 10. The graphic image 10 has been scanned into a computer memory by known scanning techniques. In particular, the graphic image 10 includes a portion of a printed musical score. FIG. 1 further shows an arbitrary highlight 12 (shaded region) of the musical score, which highlight 12 may be earmarked in a conventional manner by a touch-screen capability.

Figure 2:
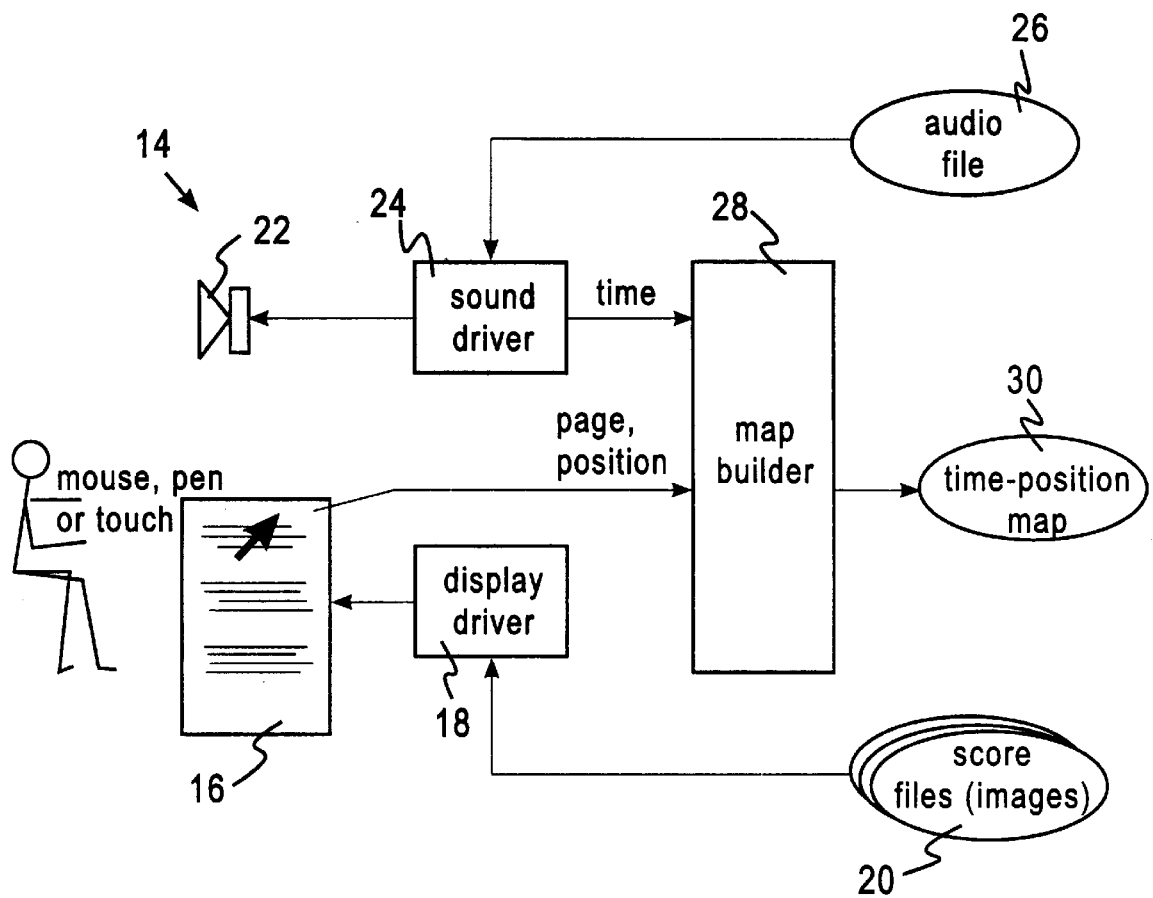
FIG. 2 shows a system architecture of the present invention during the construction of a time-place mapping.

As summarized above, it is an objective of the present invention to relate an illustrative FIG. 1 type spatially based graphic image 10 with a complementary time-based media file. FIG. 2, to which attention is now directed, shows an exemplary system architecture 14 which may be used to this end.

In overview, the FIG. 2 system architecture 14 shows that a user can follow (point to) a scanned in score, (numerals 16–20), while listening to a complementary time-based media file comprising an audio file (numerals 22–26). A map builder 28 can create a time-position map 30 which can relate movement of the pointing device over the graphic image while the media file is presented, thereby constructing the time-place mapping. An illustrative map builder flowchart is shown in FIG. 3 (numeral 32).

Figure 3:
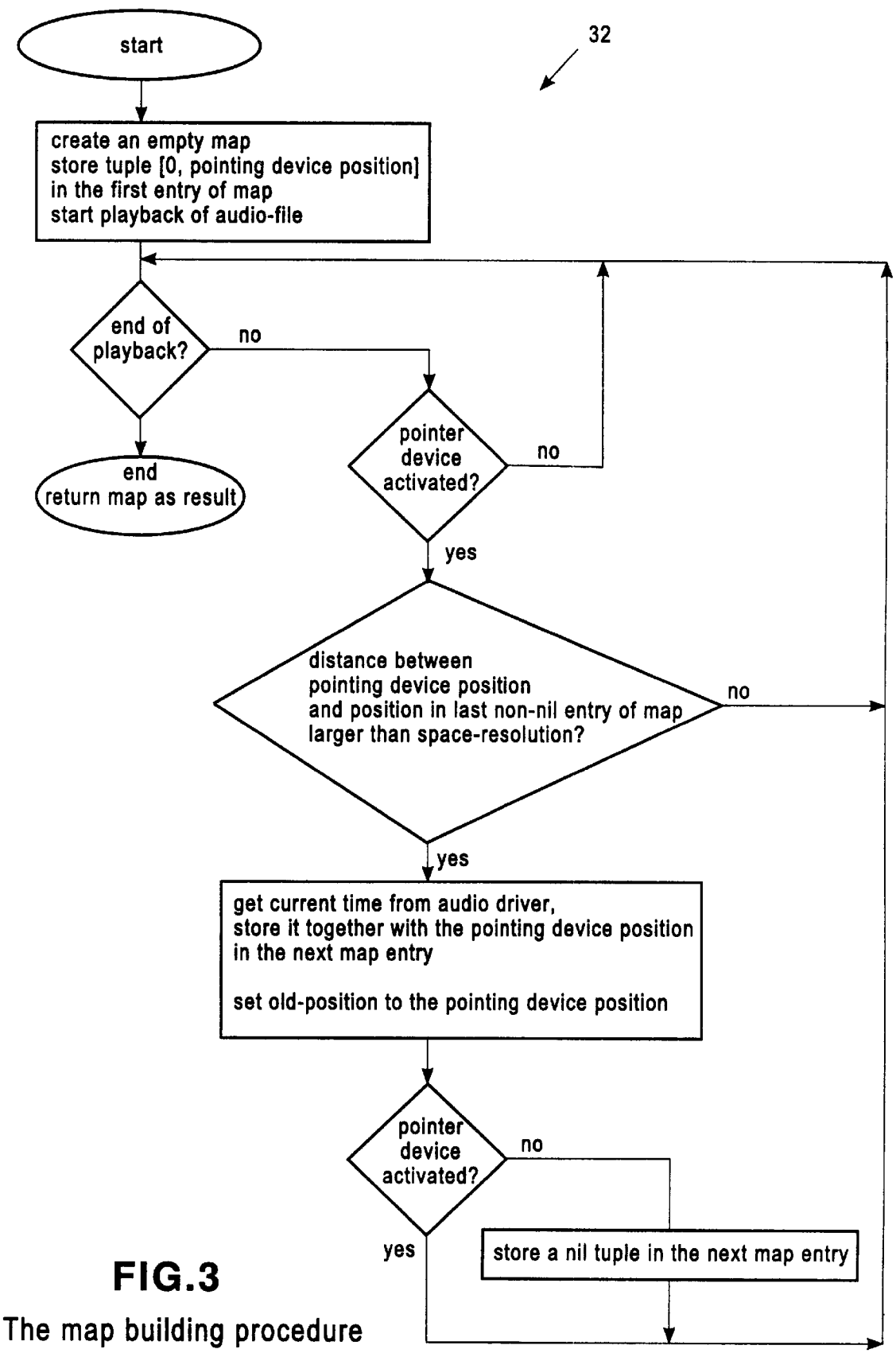
FIG. 3 shows a flowchart for realization of a map-building component of the system architecture.

Central to the FIG. 3 flowchart program is a construction and interpretation of a time-position map. This map can store the track of the pointing device while the user 'reads along' with the music, and is used in subsequent interpretations of pointing position and time. Preferably, one such map exists for every page of the score. This map may also be pre-constructed and stored by e.g., the distributor of the time-based media and the graphic files.

A map preferably is an array in which time-position tuples are stored in increasing time order. To prevent information overload, subsequent positions preferably are only stored when they differ by more than a certain space accuracy. In a map, disjoint sections of pointer tracks may be stored (when the pointing device is lifted or released), each ending with a specific nil mark. These sections usually correspond to lines (systems) in the score, and the breaks between them indicate where a section break needs to be drawn.

There is one constructor procedure that builds a map, and two accessor functions that use one to either find the position of a point in time, or the time associated with a certain position.

Figure 4:
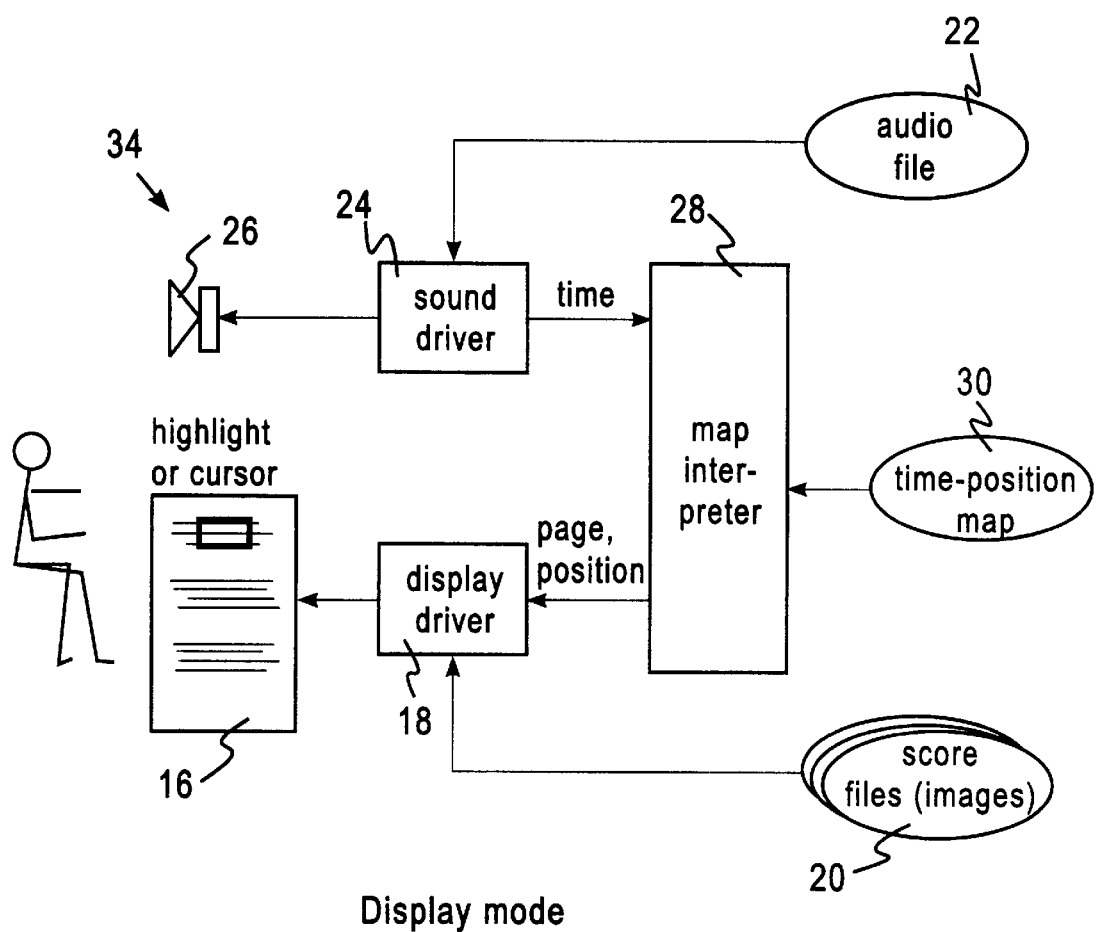
FIG. 4 shows a display mode embodiment of the system architecture.
Figure 6:
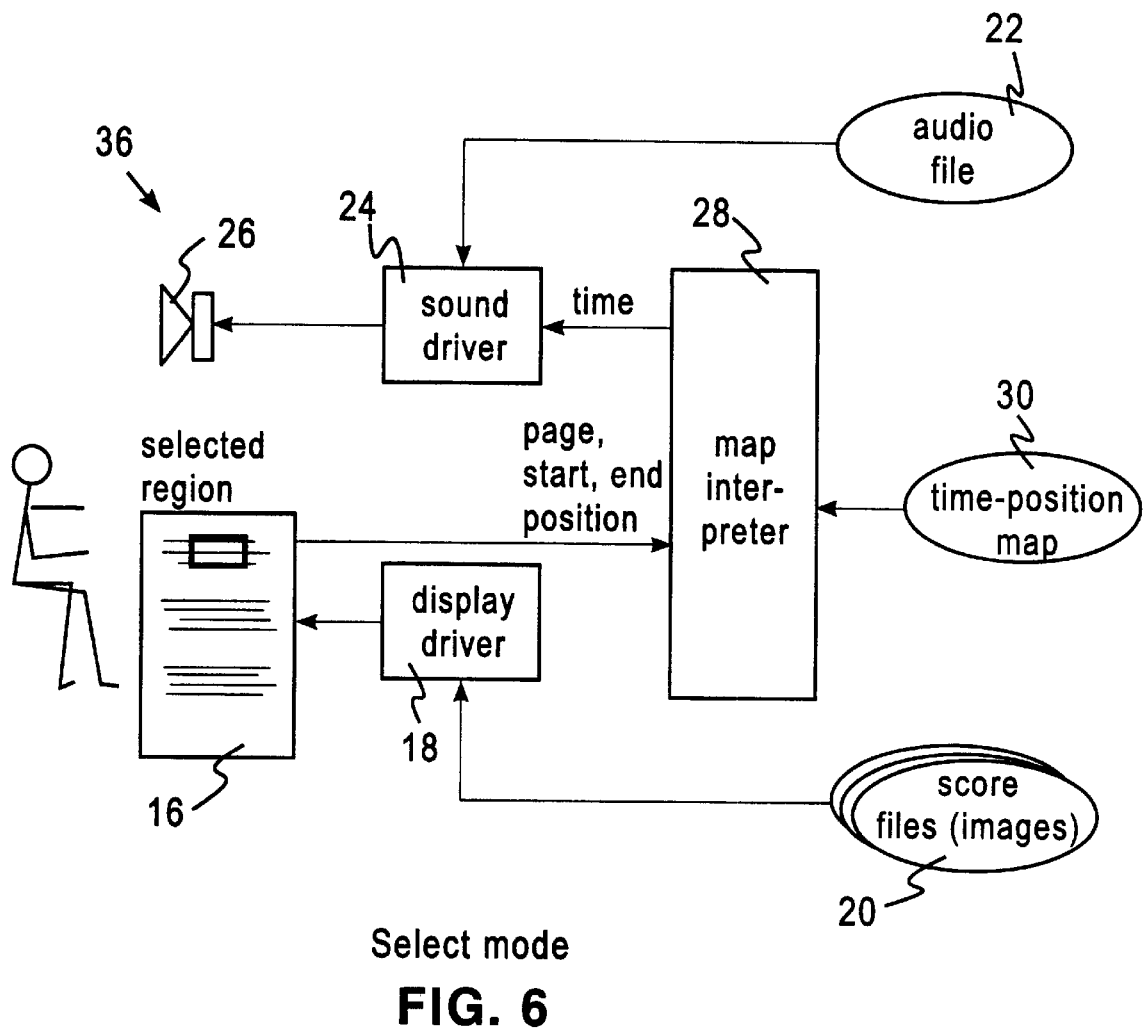
FIG. 6 shows a select mode embodiment of the system architecture.
Figure 8:
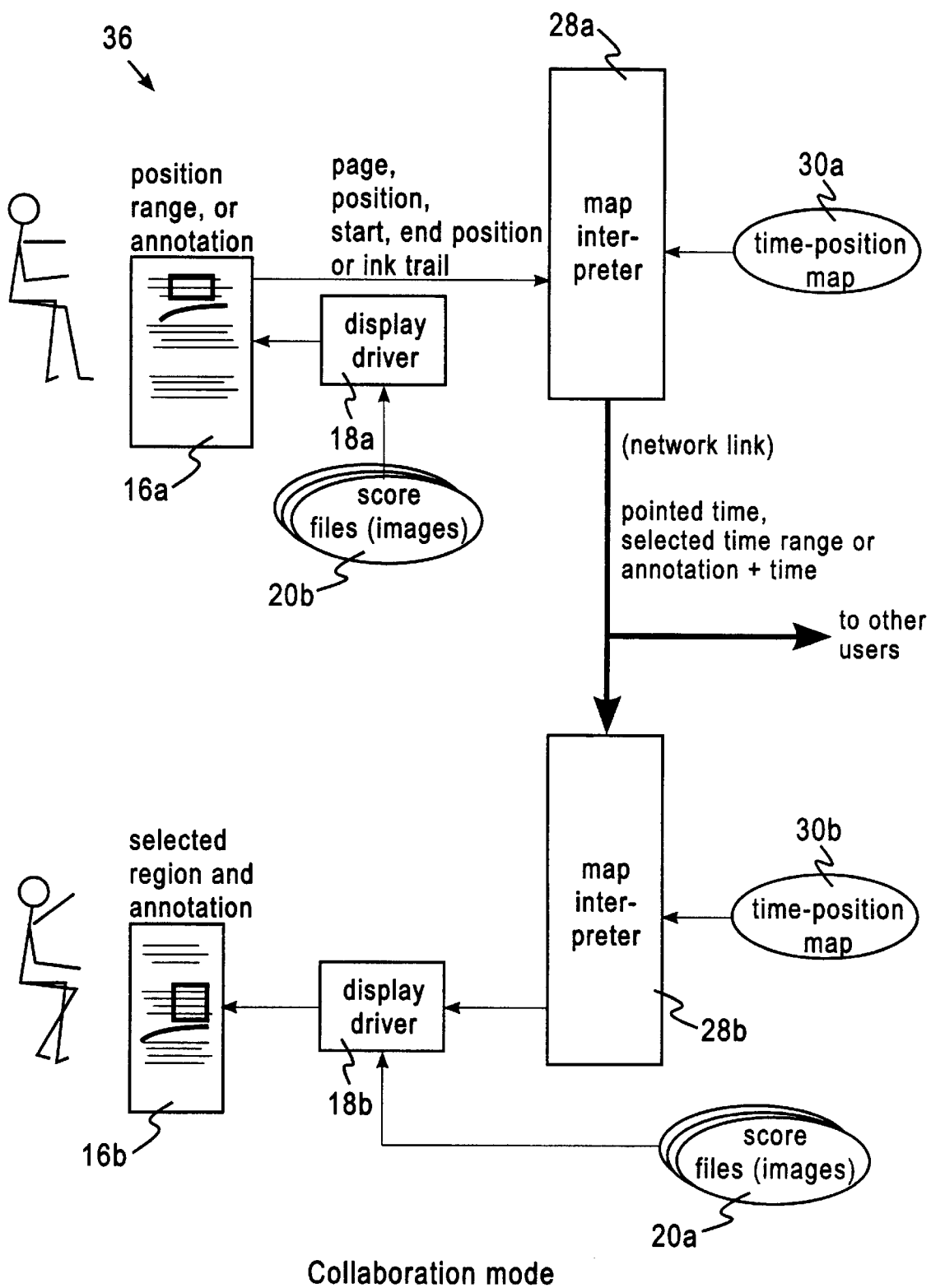
FIG. 8 shows a collaboration mode embodiment of the system architecture for computers connected in a network.

Attention is now directed to FIGS. 4, 6 and 8, which show alternative embodiments of the FIG. 2 system architecture 14, dedicated respectively to display, select, and collaboration modes (numerals 34, 36, 38).

Figure 5:
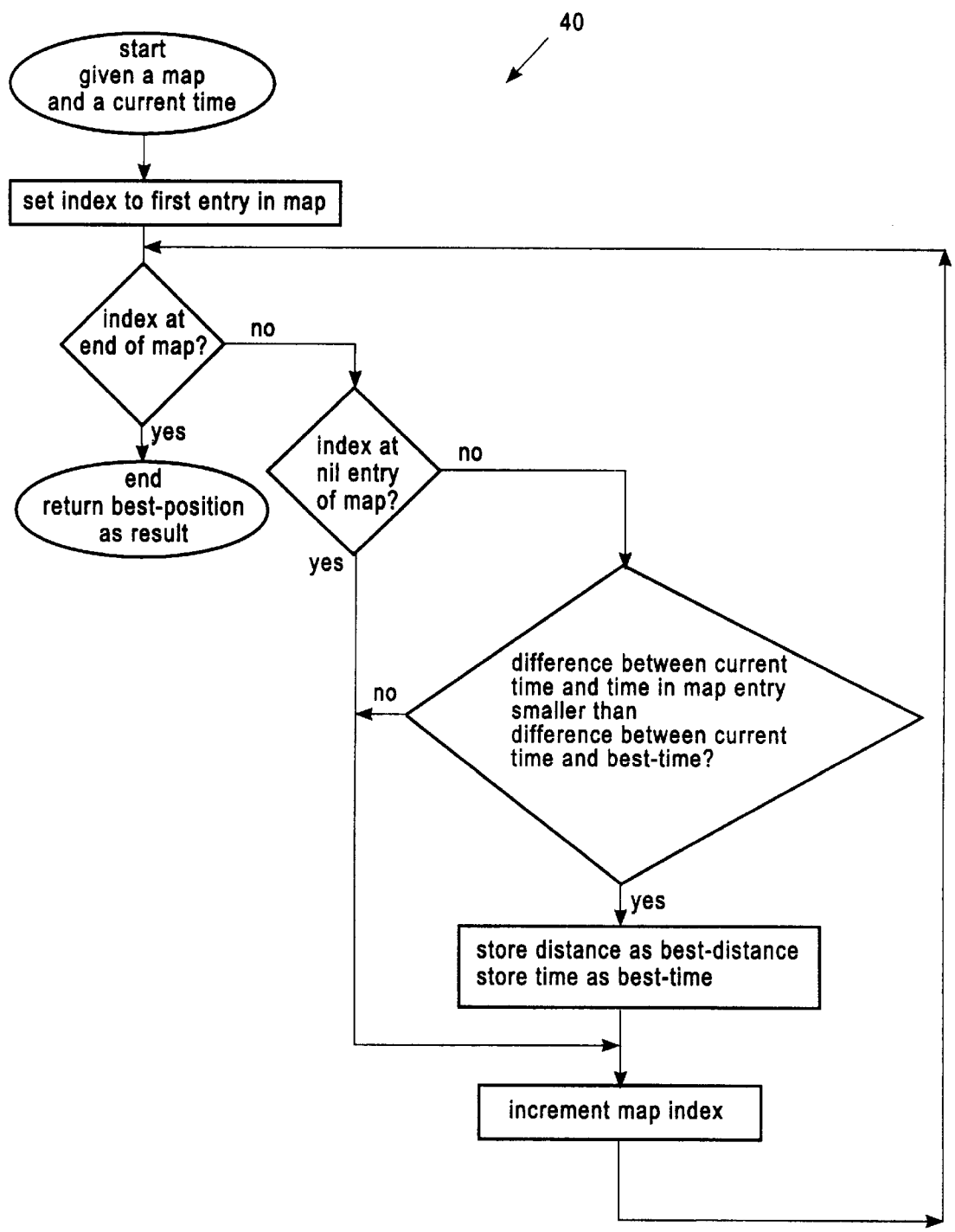
FIG. 5 shows a flowchart for realization of a map-interpreting component of the FIG. 4 mode.

In particular, the FIG. 4 display mode 34 is one wherein the computer can follow the score (pointing a cursor, turning the pages) while playing the audio file. A user may play a solo to the accompaniment played by the computer. FIG. 5 provides a flowchart 40 for realization of the display mode.

Figure 7:
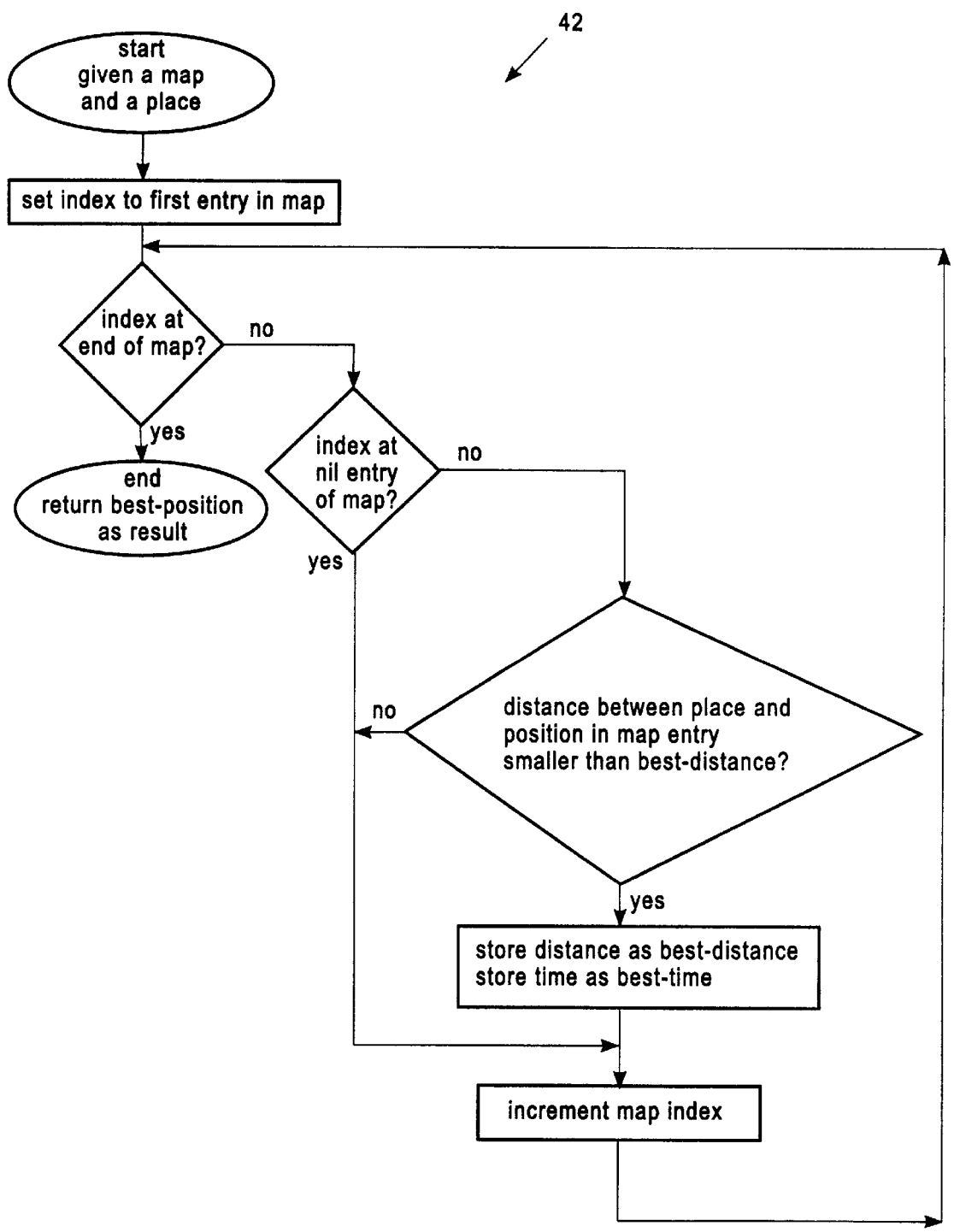
FIG. 7 shows a flowchart for realization of a map-interpreting component of the FIG. 6 mode.

The FIG. 6 select mode 36, on the other hand, is one wherein a user can select a fragment in the score, and the computer plays it. FIG. 7 provides a flowchart 42 for realization of the select mode.

The FIG. 8 collaboration mode 38, finally, is one wherein multiple users, each with a possibly different graphical image corresponding to the same time-based media file, are shown each other's pointing, annotation, and selecting actions in the position appropriate for each graphical image.

What is claimed is:

1. A computer system comprising:
   1) means for storing a time-based media file that corresponds to a portion of a media event;
   2) means for storing a graphic image that corresponds to the portion of the media event; and
   3) means for relating time position in the media file with spatial position in the graphic image that corresponds to the portion of the media event, so that a time-place mapping is created between the media file and the graphic image.

2. A computer system according to claim 1, wherein the time-based media file comprises an audio file.

3. A computer system according to claim 1, wherein the time-based media file comprises a video.

4. A computer system according to claim 1, wherein the graphic image corresponds to a musical score.

5. A computer system according to claim 1, comprising means for moving a pointing device over the graphic image while the media file is presented, thereby constructing the time-place mapping.

6. A computer method comprising the steps of:
   1) storing a time-based media file that corresponds to a portion of a media event;
   2) storing a graphic image that corresponds to a portion of the media event; and
   3) relating time position in the media file with spatial position in the graphic image that corresponds to a portion of the media event by moving a pointing device over the graphic image while the media file is presented, thereby constructing a time-place mapping between the media file and the graphic image.

7. A method according to claim 6, comprising a step of displaying a state of the media file by indicating a selected portion of the graphic image.

8. A method according to claim 6, comprising a step of selecting a fragment of the media file pointing at the graphic image.

9. A method according to claim 6, comprising a step of displaying pointing gestures and selections made by one user in the graphical image to appear in the appropriate position in another graphical image with another layout presented to another user by first relating a space position in the first image to a time position using the map corresponding to that image and then relating this time position to a space position in the other image using the map of this second image.

10. A computer system as recited in claim 1, further including
    means for storing said time-place mapping.

11. A computer system as recited in claim 10, further including
    means for accessing a portion of said graphic image from storage based upon a selected position in said media file.

12. A computer system as recited in claim 10, further including
    means for accessing a portion of said media file from storage based upon a selected spatial position in said graphic image.

13. A computer system as recited in claim 11, further including
    means for accessing a sequence of portions of said graphic image in accordance with presentation of said media file.

14. A computer system as recited in claim 13, further including
    means for accessing a sequence of portions of another graphic image in accordance with presentation of said media file.

15. A computer system as recited in claim 14, wherein said graphic image and said another graphic image include different sets of pointing, annotation and selecting action information.

16. A method as recited in claim 6, including the further step of
    storing said time-place mapping.

17. A method as recited in claim 16, including the further step of
    accessing a portion of said media file in accordance with a selected location in said graphic image.

18. A method as recited in claim 16, including the further step of
    accessing a portion of said graphic image in accordance with a selected location in said media file.

19. A method as recited in claim 18, wherein said accessing step is repeated in accordance with a presentation of said media file.

20. A method as recited in claim 18, including the further step of
    accessing a portion of another graphic image in accordance with a selected location in said media file.

* * * * *